Patented Aug. 28, 1934

1,971,634

UNITED STATES PATENT OFFICE 1,971,634

PROCESS OF PRODUCING AN OXIDIZED OIL GEL

Julian T. Baldwin, West Chester, Pa.

No Drawing. Application November 24, 1930,
Serial No. 497,948. Renewed January 24, 1934

14 Claims. (Cl. 87—12)

This invention relates to material for liquid and plastic coating compositions, and to new products and the procedure for making them. It pertains particularly to dispersions of oil gels, especially highly oxidized oil gels suitable for use as coating compositions either by themselves or incorporated with nitrocellulose lacquers, vinyl ester lacquers, oil varnishes, etc., or as raw materials for synthetic resin manufacture or as liquid vehicles for linoleum ingredients.

When linseed oil or other drying oils dry they form a solid, elastic mass which is called a gel. This gel is considered insoluble. Parts of it may be extracted with powerful solvents, the amount capable of being extracted depending on the degree of hardening or oxidation of the oil, highly oxidized oil gels having less extractible matter than those only partially oxidized.

Oxidized "scrim oil" used in linoleum manufacture has only a portion of its matter extractible with powerful solvents, and one of the control tests applied thereon consists in extracting the "scrim oil" in a refluxing apparatus for three days with toluol and with petroleum ether. For example, a good "scrim oil" containing 40% matter extractible with toluol and 20% extractible with petroleum ether, has 60% and 80% of its matter insoluble after this drastic treatment. This latter portion is referred to as the insoluble part, and has apparently not been dissolved.

The oxidized oil, however, if it could be made to completely dissolve, could be made into a solution or dispersion suitable as a vehicle for paints, and such paints would dry by evaporation, largely, since the oil would be already oxidized. The paint could then be first dried under scientifically controlled conditions, then applied to the surface to be painted.

It has been discovered that the problem of dissolving or dispersing the so-called insoluble oil gels can be solved by subjecting the gel to pressure in the presence of a dispersing agent or medium. The pressure may be mechanical or vapor pressure. The pressure, if mechanical, may be applied by passing a mixture of the gel and dispersing agent through a pair, or a plurality of pairs, of grinding rolls as they are known in the linoleum industry. A number of passes through the rolls are requisite for securing the thorough dispersion of the gel. The finest dispersions of the gel are obtained by the use of vapor pressure, although the gel may be subjected first to mechanical pressure, then to vapor pressure, then again to mechanical pressure, so that the gel is subjected to mechanical pressure both before and after the vapor pressure treatment. This dispersing process is set forth in detail in my copending application, Serial No. 497,947, of even date herewith. It is generally desirable to subject the solutions obtained by this process to further treatment. This consists of applying heat to the residue left after the evaporation or removal of the dispersing agents or solvents. The heat reaction becomes very rapid at 460° F. and the gel is transformed to an infusible, insoluble solid when oxidized linseed or China-wood oils are used. The reaction is carried out at a lower temperature as 300° F. to avoid discoloration and decomposition. It is desirable in most cases to stop the reaction before the insoluble, infusible state is reached. This may be done by cutting with solvent at the proper time. This treatment very greatly increases the resistance of the oil to alkalies or aqueous liquids. The length of time and the temperature required to form the insoluble infusible form depend on the nature of the original oil. With highly oxidized linseed and China-wood oils the time required to make this form is from five to fifteen minutes at 420° F. At lower temperatures the time increases. Reactive agents as phenols or reactive anti-oxidants up to 5% by weight of the oil may be incorporated with the oil before this hardening process. The addition of resins during or before the cooking reduces the viscosity of the gel solutions in most cases. Glycerine may be added to esterify the free acids.

Since this heat treatment eventually makes an insoluble, infusible form, it suggests the use of these dispersed oil gels as moulding plastics.

Other gels besides those which are secured primarily by oxidation may be dispersed by this treatment. Thus oils, including non-drying oils, gelled by sulphur or sulphur chloride may be dispersed by this treatment. China-wood oil gelled by ferric chloride or by heat treatment may be dispersed. Mineral oils are not included within the terms "oil" or "oil gel" as applied to the present invention. These terms are to be considered as including fatty oil material.

The dispersed oil gel may be caused to regel by evaporation of the dispersing agent, then it may be further oxidized or hardened and redispersed as before.

It is an object of this invention to accomplish a further oxidation of an oil gel which has been initially oxidized by mechanical drying processes so as to produce a much more highly oxidized oil having properties similar to those of scrim oil, and which shall hereinafter be referred to as "secondarily oxidized oil". As a starting material for the production of "secondarily oxidized oil" either a dried oil in the form of an initial gel, or a dispersed oil gel which has been allowed to regel by evaporation of the dispersing agent, may be employed.

The process with which the present invention is concerned consists in dispersing an oil gel of one of the types described above with dispersing agents such as ethyl alcohol-toluol, ethyl acetate, benzol, ether, acetone and petroleum under pressure, as set forth hereinbefore and also in my copending application Serial No. 497,947 of even date herewith, then introducing oxygen under pressure into the dispersion while agitating so as to bring the oxygen in intimate contact with the dispersion. By this procedure an oil oxidized by the ordinary mechanical process of oxidation, hereinafter referred to as "mechanical oil" may be much more highly oxidized so that it will replace, in its properties, oil oxidized by the scrim process. The mechanical process of oxidation takes twelve hours and the scrim process takes about two months.

A specific example of an improved process as carried out in accordance with the present invention is as follows:

10 parts by weight of "mechanical oil" and 30–60 parts by weight of carbon tetrachloride are heated in a pressure vessel made of alloy or other material which is acid-resistant at 230° F. and 4 atmospheres pressure until the oil is dissolved. Then 1% of the weight of the oil of lead metal as fused lead resinate is added, and oxygen, or air, is introduced into the pressure vessel using a pressure of 300 lbs. per square inch and the vessel is cooled when the temperature goes over 250° F. The use of oxygen is preferable to that of air, since with air an escape valve is necessary so that the nitrogen remaining after the absorption of the oxygen by the oil may be expelled. This leads to a waste of dispersing agent. The resulting dispersion of highly oxidized oil in carbon tetrachloride may be used as an ingredient in protective coatings, in spraying linoleum, etc. Or the dispersing agent may be distilled off and the residue used as a plastic ingredient in linoleum.

Throughout the specification and claims, the expression "pure oil gels" is to be understood as meaning oil gels formed by initial drying processes from pure drying oils, and containing no other ingredients than the oxidized or modified oil itself, thereby excluding any such gels as those formed from linoleum scrap or like materials containing water soluble materials, coloring matter or other impurities harmful in paints or varnishes.

Also, in the specification and claims, the term "dispersion" is to be taken as including all liquid mixtures of carrier and secondary material wherein the two are so thoroughly intermingled as to make discrete particles of the secondary material invisible to the naked eye, thereby including true solutions as well as dispersions. The term "dispersing agent" is to be taken to mean a liquid carrier in the nature of either a solvent or a medium for holding colloid particles.

In place of oxidized oil gels, oxidized esters of unsaturated aliphatic acids derived from other sources may also be used, for the purpose of producing highly oxidized esters of the same type.

This application is a continuation in part of my copending application of even date, Serial No. 497,947.

What I claim is:

1. The process of producing a highly oxidized oil which comprises heating in an enclosed space a mixture of a dispersing agent and oxidized oil gel excluding linoleum filling substances and other linoleum materials, until dispersion has occurred, then adding a small quantity of a drier and introducing oxygen under pressure while agitating so as to bring the oxygen into intimate contact with the dispersion.

2. The process of producing a highly oxidized oil which comprises heating in an enclosed space a mixture of a dispersing agent and oxidized oil gel excluding linoleum filling substances and other linoleum materials under a vapor pressure of about 4 atmospheres until dispersion has occurred, then adding a small quantity of a drier and introducing oxygen under pressure while agitating so as to bring the oxygen into intimate contact with the dispersion.

3. The process of producing a highly oxidized oil which comprises heating in an enclosed space a mixture of a dispersing agent and oil gel excluding linoleum filling substances and other linoleum materials, until dispersion has occurred, the said oil gel having been selected from a group comprising oil gelled by oxidation, oil gelled by sulphur or sulphur chloride, oil gelled by ferric chloride, and oil gelled by heat treatment; then adding a small quantity of a drier and introducing oxygen under pressure while agitating so as to bring the oxygen into intimate contact with the dispersion.

4. The process of producing highly oxidized esters of unsaturated aliphatic acids, which process comprises heating in an enclosed space a mixture of oxidized esters of unsaturated aliphatic acids and a dispersing agent until dispersion has occurred, then adding a small quantity of a drier and introducing oxygen under pressure while agitating so as to bring the oxygen into intimate contact with the dispersion.

5. The process of producing highly oxidized esters of unsaturated aliphatic acids, which process comprises heating in an enclosed space a mixture of oxidized esters of unsaturated aliphatic acids and a dispersing agent under a vapor pressure of about four atmospheres until dispersion has occurred, then adding a small quantity of a drier and introducing oxygen under pressure while agitating so as to bring the oxygen into intimate contact with the dispersion.

6. The process of producing a highly oxidized oil which comprises subjecting a dispersion of oil gel in a volatile dispersing medium to pressure, and introducing oxygen into the dispersed gel.

7. The process of producing a stable dispersion at atmospheric pressure of a highly oxidized oil gel in a volatile dispersing medium which comprises subjecting a dispersion of oil gel in a volatile dispersing medium to pressure, the said oil gel having been selected from a group comprising oil gelled by oxidation, oil gelled by sulphur or sulphur chloride, oil gelled by ferric chloride, and oil gelled by heat treatment; introducing oxygen into the dispersed gel, and reducing the pressure to atmospheric.

8. The process of producing a highly oxidized oil which comprises subjecting a dispersion of a partially oxidized oil gel in a volatile dispersing medium to pressure, and introducing a quantity of oxygen into the dispersed gel in sufficient amount to completely oxidize said gel.

9. The process of producing a highly oxidized oil gel which comprises subjecting a mixture of a liquid volatile dispersing medium and oil gel excluding linoleum filling substances and other linoleum materials, to pressure to produce a dispersion of the gel in said liquid, the said oil gel having been selected from a group comprising oil gelled by oxidation, oil gelled by sulphur or sulphur chloride, oil gelled by ferric chloride, and oil gelled by heat treatment; and introducing oxygen under pressure into said dispersion of gel.

10. The process of producing a highly oxidized oil gel which comprises subjecting a mixture of a liquid volatile dispersing medium and partially oxidized oil gel excluding linoleum filling substances and other linoleum materials to pressure to produce a dispersion of the gel in said liquid, and introducing oxygen under pressure into said dispersed gel.

11. The process of producing a highly oxidized oil gel which comprises subjecting a mixture of a volatile dispersing medium and partially oxidized oil gel excluding linoleum filling substances and other linoleum materials to artificially imposed vapor pressure of the liquid to produce a dispersion of the gel in said liquid, and introducing oxygen under pressure into said dispersed gel.

12. The process of producing a highly oxidized oil gel which comprises subjecting a mixture of a liquid volatile dispersing medium and partially oxidized oil gel excluding linoleum filling substances and other linoleum materials to mechanical pressure supplemented by artificially imposed vapor pressure of the volatile liquid to produce a dispersion of the gel in said liquid, and introducing oxygen under pressure into said dispersion of gel in liquid.

13. The process of producing a highly oxidized oil gel which comprises subjecting a mixture of a liquid volatile dispersing medium and partially oxidized oil gel excluding linoleum filling substances and other linoleum materials to vapor pressure applied by heating the gel and liquid together in an enclosed space until a vapor pressure of about four atmospheres has developed to produce an unfilterable dispersion of the gel in said liquid, and introducing oxygen under pressure into said dispersion of gel in liquid.

14. The process of producing a highly oxidized oil gel which comprises subjecting a mixture of a liquid volatile dispersing medium and partially oxidized oil gel excluding linoleum filling substances and other linoleum materials to artificially imposed vapor pressure of the liquid and mechanical pressure applied to the gel and liquid before and after the application of vapor pressure causing an unfilterable dispersion of gel in said liquid, and introducing oxygen under pressure into said dispersion of gel in liquid.

JULIAN T. BALDWIN.